UNITED STATES PATENT OFFICE.

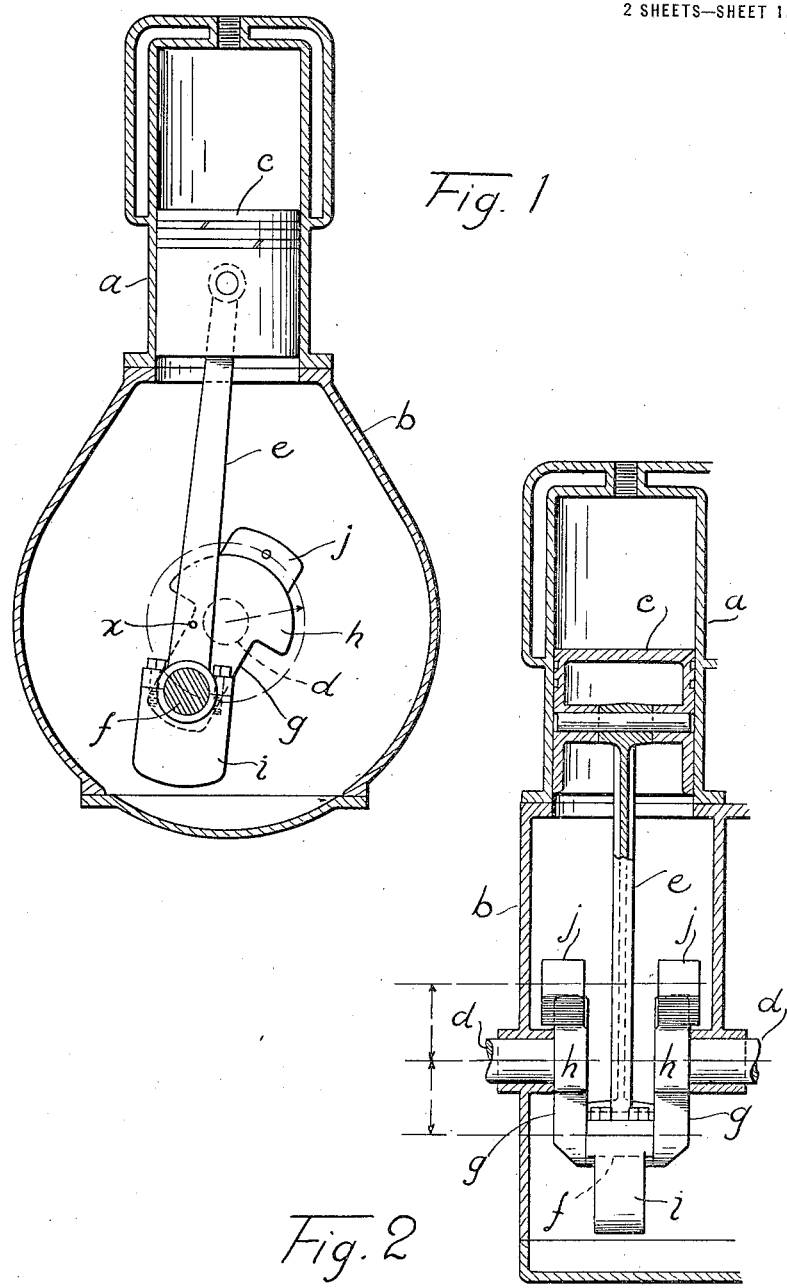

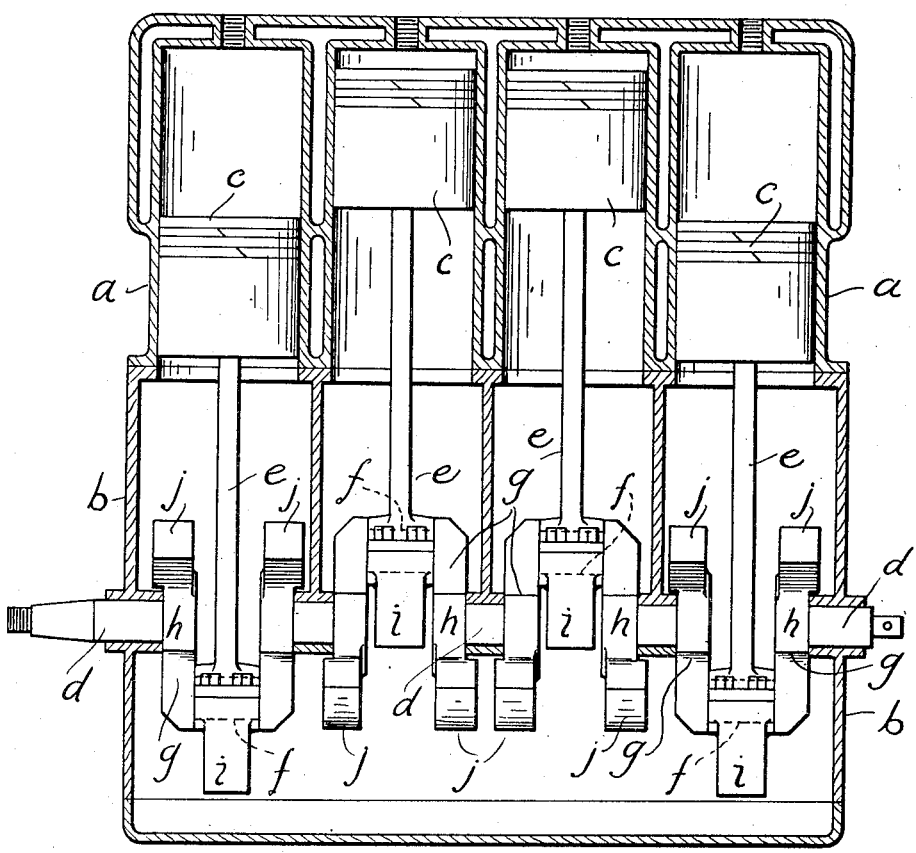

GEORGE N. GOODRICH, OF DETROIT, MICHIGAN, ASSIGNOR TO CONTINENTAL MOTORS CORPORATION, OF DETROIT, MICHIGAN, A CORPORATION OF VIRGINIA.

MOTION-CONVERTING MEANS.

1,355,468.  Specification of Letters Patent.  Patented Oct. 12, 1920.

Application filed January 24, 1916. Serial No. 73,798.

*To all whom it may concern:*

Be it known that I, GEORGE N. GOODRICH, a citizen of the United States, residing at Detroit, county of Wayne, State of Michigan, have invented a certain new and useful Improvement in Motion-Converting Means, and declare the following to be a full, clear, and exact description of the same, such as will enable others skilled in the art to which it pertains to make and use the same, reference being had to the accompanying drawings, which form a part of this specification.

This invention relates to balancing motion converting means. It is especially designed for balancing the connecting rods of an internal combustion engine so as to do away as much as possible with the unbalanced forces in the operation of a gas engine.

It has been found by actual test that the efficiency of an automobile engine is greatly enhanced by simply balancing the crank shaft against the centrifugal forces tending to distort it. This increased efficiency has been known in one make of car to approximate 80% increase in available horse power.

It is the object of my invention not only to balance the crank shaft so as to give it a static balance and a running balance but also to give the connecting rods a static and running balance.

In the drawings,—

Figure 1 is a vertical cross section of a gas engine.

Fig. 2 is a vertical longitudinal section of a part of a gas engine.

Fig. 3 is a longitudinal section of a multi-cylinder engine.

$a$ designates the engine cylinder; $b$ the crank case; $c$ the piston; $e$ the connecting rod; $d$ the crank shaft; $f$ the crank pin portion of the crank shaft; and $g$ the crank arms.

In order to balance the centrifugal forces which tend to distort a crank shaft, it is old in the art to add counter-weights $h$ on the opposite ends of the crank arms. This secures a running balance for the crank shaft.

Ordinarily the center of gravity in the connecting rod is at some point as at $x$ between the crank pin and the wrist pin. Now it is obvious that when the center of gravity is at such a point as at $x$, the center of gravity does not travel in a true circular path but in a path approximating an oval. Now it is my purpose to make the center of gravity of the connecting rod travel in a true circular path, and to this end I add a weight $i$ to the end of the connecting rod which is so calculated as to bring the center of gravity of the connecting rod at the axis of the crank pin. Inasmuch as the axis of the crank pin obviously travels in a true circle, then the center of gravity of the mass represented by the connecting rod will travel in a true circle.

As we have already seen, naked crank shafts had been balanced but not with the connecting rods added. The connecting rods have been considered unsuitable for balancing for the center of gravity of the connecting rod does not travel in a circular path but in a path more nearly oval-shaped as one end travels in a true circular path and the other end in a rectilinear path.

Now by bringing the center of gravity of the connecting rod to coincidence with the axis of the crank pin, this will bring the effective forces of this mass into a circular path of travel which will allow it to be counter-balanced by the added counter-weights $j$, which I have here shown as added to the counter-weights $h$ on the ends of the crank arms.

The weight of these added or secondary counter-weights will depend upon the ratio between the radial distance from the center of revolution to the center of gravity of the added counter-weight, and the radial distance from the center of revolution to the center of gravity of the connecting rod. In the drawings the center of gravity of the additional counter-weight is shown to be of the same radial distance from the center of revolution as is the center of gravity of the connecting rod. Consequently on a two arm crank throw each counter-weight will be just one-half the mass of the connecting rod and its weighted end $i$. If the center of gravity of the added counter-weight $j$ is of a less radial distance from the center of revolution than the center of gravity of the connecting rod and its weighted end $i$, then the mass of the added counter-weight $j$ will have to be increased proportionally; and vice versa, if the center of gravity is further away the masses will be lessened. The purpose of the added counter-weights is to bring the center of gravity of the whole mass including the crank shaft, primary counter-weights, connecting rods and added counter-weights, at the axis of revolution of the crank shaft.

I claim—

1. Motion converting means, having in combination, a crank shaft arranged to be balanced when unattached, a connecting rod arranged to have its center of gravity coincident with the axis of the crank pin, and a counter-weight added to the crank shaft to balance the connecting rod mass.

2. Motion converting means, having in combination, a crank shaft, counter-weights thereon for giving the crank shaft a running balance, a connecting rod proportioned to have its center of gravity coincident with the axis of the crank pin, and an added counter-weight calculated to give the masses of the connecting rod a running balance.

3. Motion converting means, having in combination, a crank shaft, counter-weights on the ends of the crank arms for giving the crank shaft a running balance, connecting rods whose centers of gravity are coincident to the axes of the crank pins, and masses added to the counter-weights to give the connecting rods a running balance.

4. Motion converting means, having in combination, a crank shaft, one or more connecting rods whose center or centers of gravity are coincident to the axis or axes of the crank pin or pins, and counter-weight masses added to bring the center of gravity of the entire mass represented by the crank shaft, connecting rods and such counter-weights at the axis of revolution of said crank shaft.

5. A crank shaft and connecting rod assembly for internal combustion engines comprising a crank shaft having crank arms and connecting rods operatively connected thereto and provided with counter-balanced portions so disposed that the couples set up by the parts when revolving neutralize each other and the axis of rotation which the revolving parts tend to assume is brought into coincidence substantially with the actual axis of rotation of the shaft.

6. A crank shaft assembly for internal combustion engines comprising a multi-throw crank shaft having journals at regular intervals, connecting rods on the shaft and counter-weights on the shaft so disposed in relation to the several crank shaft sections and connecting rods that the couples resulting from the revolution of the parts, practically neutralize each other and that the axis of rotation which the parts tend to assume is substantially coincident with the actual axis of rotation of the shaft.

7. A crank shaft assembly for internal combustion engines comprising a multi-throw crank shaft having journals at regular intervals, connecting rods on the shaft so counter-weighted that the effective center of mass of each connecting rod coincides substantially with the companion crank pin axis and counterbalances on the shaft crank arms so coöperating with the counterbalances on the connecting rods that the couples set up by the respective parts when revolving practically neutralize each other so that the axis of rotation which the parts tend to assume is substantially coincident with the actual axis of rotation.

8. A crank shaft assembly for internal combustion engines, comprising a crank shaft having crank arms and journals at intervals, connecting rods having crank pin connections with the arms and counterbalance weights for each crank arm and associated connecting rod so disposed that the couples set up by the revolving parts are practically in equilibrium when turning whereby the parts when revolving tend to assume an axis of rotation coincident with the actual axis of rotation to which the shaft is confined.

9. In a crank shaft assembly for internal combustion engines, a crank shaft having crank arms with crank pin connections adjacent journal portions of the shaft, connecting rods for the crank arms so proportioned that the couples set up by the revoluble portions of the rods around the points of connection with the crank shaft practically neutralize each other and counter-balances so disposed between the journals in relation to the crank arms and associated connecting rods that the couples set up by the shaft and associated parts around the axis of rotation of the shaft are practically neutralized and the axis of rotation which the shaft tends to assume is brought into substantial coincidence with the actual axis of rotation of the shaft.

10. A crank shaft and connecting rod assembly for engines comprising a crank shaft having crank arms and connecting rods operatively connected thereto, said shaft and rods provided with counter-balanced portions so disposed in relation to the crank arms and connected parts that the couples set up by the revolving parts around the respective centers of motion are practically neutralized and the axis of rotation which the assembled structure tends to assume is substantially coincident with the actual axis of rotation of the shaft.

In testimony whereof I sign this specification.

GEORGE N. GOODRICH.